US009690966B2

(12) United States Patent
Wu et al.

(10) Patent No.: US 9,690,966 B2
(45) Date of Patent: Jun. 27, 2017

(54) TWO-DIMENSIONAL CODE BASED INFORMATION ACQUISITION SYSTEM AND METHOD THEREOF

(71) Applicant: Shenglong Wu, Dalian (CN)

(72) Inventors: Shenglong Wu, Dalian (CN); Yong Xia, Dalian (CN)

(73) Assignee: Shenglong Wu, Dalian (CN)

( * ) Notice: Subject to any disclaimer, the term of this patent is extended or adjusted under 35 U.S.C. 154(b) by 0 days.

(21) Appl. No.: 15/128,762

(22) PCT Filed: Mar. 3, 2015

(86) PCT No.: PCT/CN2015/073541
§ 371 (c)(1),
(2) Date: Sep. 23, 2016

(87) PCT Pub. No.: WO2015/143970
PCT Pub. Date: Oct. 1, 2015

(65) Prior Publication Data
US 2017/0103244 A1 Apr. 13, 2017

(30) Foreign Application Priority Data
Mar. 25, 2014 (CN) .......................... 2014 1 0115112

(51) Int. Cl.
*G06K 7/10* (2006.01)
*G06K 9/36* (2006.01)
*G06K 9/80* (2006.01)
*G06K 7/14* (2006.01)
*G06K 19/06* (2006.01)

(52) U.S. Cl.
CPC ..... *G06K 7/1417* (2013.01); *G06K 19/06037* (2013.01)

(58) Field of Classification Search
CPC .. G06K 7/10; G06K 9/36; G06K 9/80; G06K 19/00; G06K 9/18; G06F 17/00
USPC ............ 235/462.1, 462.09, 462.01, 375, 487
See application file for complete search history.

(56) References Cited

U.S. PATENT DOCUMENTS 7,088,859 B1 * 8/2006 Yamaguchi .......... G09B 21/006
382/181
2012/0330769 A1 * 12/2012 Arceo ................ G06Q 20/4014
705/21

* cited by examiner

Primary Examiner — Edwyn Labaze
(74) Attorney, Agent, or Firm — PROI Intellectual Property US

(57) ABSTRACT

An information collecting system and method based on two-dimensional code are provided. The information collecting system comprises an intelligent terminal and an information collecting end. The intelligent terminal comprises: a first communication module; a first storage module; a display module; a first processing module; an input module; a two-dimensional code output module I; and a two-dimensional code generation module I. The information collecting end comprises: a second communication module; a second storage module; a two-dimensional code recognition module II; and a second processing module. The information collecting process of the present invention is easy, convenient, quick and efficient to operate, thus increasing information collecting efficiency greatly, reducing user time consumption, avoiding the defects that mistakes of information collecting mode are prone to being made and important user information is prone to being revealed due to manual filling or dictation in the prior art, and ensuring the user information safety effectively.

10 Claims, 2 Drawing Sheets

TWO-DIMENSIONAL CODE BASED INFORMATION ACQUISITION SYSTEM AND METHOD THEREOF

CROSS REFERENCE TO RELATED APPLICATIONS

The present application is the US national stage of International Patent Application PCT/CN2015/073541 filed on Mar. 3, 2015, which, in turn, claims priority to Chinese Patent Application CN 201410115112.1 filed on Mar. 25, 2014.

TECHNICAL FIELD

The present invention relates to the field of information processing technologies, and more particularly, to a two-dimensional code based information acquisition system and a method thereof.

BACKGROUND

A two-dimensional code is an important technology in the automatic identification of information, and is one of key and core technologies in the industry of Internet of Things. As a timely, accurate, reliable, and economical data input and transmission way, the two-dimensional code has been widely applied in many fields including industry, business, national defense, transportation, finance, medical treatment, hygiene, etc. However, the application field at current is mainly that a merchant provides information to a user based on the two-dimensional code, such as a website link, a commodity introduction, and other product information. Actually, the user needs to provide some personal information to the merchant or other information collection terminal in many occasions. For example, the user needs to provide a company name to the merchant for invoicing; and for another example, the user may also need to provide name, address, telephone, mailbox, ID Card No., and other information for information registration. However, for these applications at present, most applications in the prior art need to be filled or explained on site by the user, which not only needs a relatively long time period and has low efficiency, but also is easy to make mistakes. Further, there is a risk that the important personal privacy information is easy to be leaked.

SUMMARY

In view of the above-mentioned problems, the present invention develops a simple, quick, effective, and safe two-dimensional code based information acquisition system and a method thereof.

The technical means of the present invention is as follows.

A two-dimensional code based information acquisition system comprises an intelligent terminal and an information acquisition end connected to the intelligent terminal.

The intelligent terminal comprises:

a first communication module configured to receive an index number list transmitted by the information acquisition end;

a first storage module configured to store an index table; the index table characterizing a corresponding relation between different index numbers and common user information types;

a display module;

a first processing module connected to the first communication module, the first storage module, the display module and an input module, and configured to determine a user information type needed by the information acquisition end according to the index number list transmitted by the information acquisition end and with reference to the index table stored by the first storage module, control the display module to display information of the user information type needed by the information acquisition end, extract each index number in the index number list, respectively establish a corresponding relation between each index number extracted and user information inputted by the input module with reference to the index table stored by the first storage module, and form integrated user information through an integration operation;

the input module configured to input corresponding user information according to the information of the user information type displayed by the display module;

a two-dimensional code output module I; and a two-dimensional code generation module I connected to the first processing module and the two-dimensional code output module I, and configured to convert the integrated user information into a corresponding two-dimensional code and output the two-dimensional code through the two-dimensional code output module I.

The information acquisition end comprises:

a second communication module configured to transmit the index number list to the intelligent terminal;

a second storage module configured to store the index table; the index table characterizing a corresponding relation between different index numbers and common user information types;

a two-dimensional code recognition module II connected to the two-dimensional code output module I, and configured to recognize the two-dimensional code outputted by the two-dimensional code output module I and parse out corresponding integrated user information; and a second processing module connected to the second communication module, the second storage module and the two-dimensional code recognition module II, and configured to generate the index number list according to a user information type that needs to be acquired and with reference to the index table stored by the second storage module, and transmit the index number list to the intelligent terminal through the second communication module to obtain user information respectively corresponding to the user information type that needs to be acquired through an extraction operation on the integrated user information.

Further:

the information acquisition end also comprises:

a two-dimensional code output module II; and a two-dimensional code generation module II connected to the second processing module, and configured to convert the index number list generated by the second processing module into a corresponding two-dimensional code and output the two-dimensional code through the two-dimensional code output module II.

Correspondingly, the intelligent terminal further comprises:

a two-dimensional code recognition module I connected to the two-dimensional code output module II, and configured to recognize the two-dimensional code outputted by the two-dimensional code output module II and parse out a corresponding index number list; wherein the first processing module is connected to the two-dimensional code recognition module I to receive the index number list parsed out by the two-dimensional code recognition module I.

Further, the integration operation may specifically be:

inserting a separator in a rear end of the user information corresponding to each index number, and then combining each index number with the user information respectively corresponding to each index number, to form the integrated user information.

Correspondingly, the extraction operation is:

looking up the separators in the integrated user information, separating the information at the front end of each of the separator from the integrated user information in sequence, and acquiring the user information needed according to the user information type characterized by the index number in the information separated.

Further, the second processing module is also configured to determine whether each index number in the integrated user information has corresponding user information while performing the extraction operation, and when at least one index number does not have corresponding user information, the second processing module is also configured to generate a user information loss prompt message, and transmit the prompt message to the intelligent terminal through the second communication module.

Further, the first processing module is also configured to store a user information type corresponding to the user information inputted by the input module to the first storage module; the first processing module may directly invoke the corresponding user information from the first storage module according to the user information type needed by the information acquisition end, and display the user information invoked through the display module corresponding to the user information type thereof; and the input module may also amend the user information invoked.

In addition, the intelligent terminal further comprises an authority management module configured to determine whether a current user has authority to view the user information stored by the first storage module; and after the authority management module determines that the user has authority to view, the first processing module invokes the user information from the first storage module and controls the display module to display the user information correspondingly.

A two-dimensional code based information acquisition method comprises the following steps of:

step 1: storing, by an intelligent terminal, an index table in advance through a first storage module, and storing, by an information acquisition end, an index table in advance through a second storage module, the index table characterizing a corresponding relation between different index numbers and common user information types;

step 2: generating, by the information acquisition end, an index number list through a second processing module according to a user information type needed to be acquired and with reference to the index table stored by the second storage module;

step 3: transmitting, by the information acquisition end, the index number list generated to the intelligent terminal through a second communication module;

step 4: receiving, by the intelligent terminal, the index number list transmitted by the information acquisition end through a first communication module;

step 5: determining, by the intelligent terminal, the user information type needed by the information acquisition end through a first processing module according to the index number list transmitted by the information acquisition end and with reference to the index table stored by the first storage module;

step 6: controlling, by the intelligent terminal, the display module to display the information of the user information type needed by the information acquisition end through the first processing module;

step 7: inputting, by the intelligent terminal, corresponding user information through an input module according to the information of the user information type displayed by the display module;

step 8: extracting, by the intelligent terminal, each index number in the index number list through the first processing module, respectively establishing a corresponding relation between each index number extracted and the user information inputted by the input module, and forming integrated user information through an integration operation;

step 9: converting, by the intelligent terminal, the integrated user information into a corresponding two-dimensional code through a two-dimension code generation module I and outputting the two-dimensional code through the two-dimensional code output module I;

step 10: recognizing, by the information acquisition end, the two-dimensional code outputted by the two-dimensional code output module I through a two-dimensional code recognition module II and parsing out the corresponding integrated user information; and step 11: obtaining, by the information acquisition end, user information respectively corresponding to the user information type that needs to be acquired through an extraction operation on the integrated user information through the second processing module.

Further, step 3 may also be: converting, by the information acquisition end, the index number list generated into a corresponding two-dimensional code through a two-dimension code generation module II and outputting the two-dimensional code through a two-dimensional code output module II.

Correspondingly, step 4 may also be: recognizing, by the intelligent terminal, the two-dimensional code outputted by the two-dimensional code output module II through the two-dimensional code recognition module I and parsing out a corresponding index number list.

Further, step 7 may also be:

storing, by the intelligent terminal, a user information type corresponding to the user information inputted by the input module in advance through the first storage module, and directly invoking the corresponding user information from the first storage module according to the user information type needed by the information acquisition end through the first processing module.

Further, after the first processing module directly invokes the corresponding user information from the first storage module according to the user information type needed by the information acquisition end, the intelligent terminal may also amend the user information invoked through the input module.

Since the technical solutions above are adopted, the two-dimensional code based information acquisition system and the method thereof provided by the present invention have an easy and convenient information acquisition process, are rapid and effective, greatly improve the information acquisition efficiency, save the time of the user, avoid the defect that the information acquisition manner in the prior art is easy to get wrong and the risk that the important information of the user is easy to be leaked due to manual filling or dictating, and are beneficial for guaranteeing the user information security effectively.

DETAILED DESCRIPTION

Figure 1:
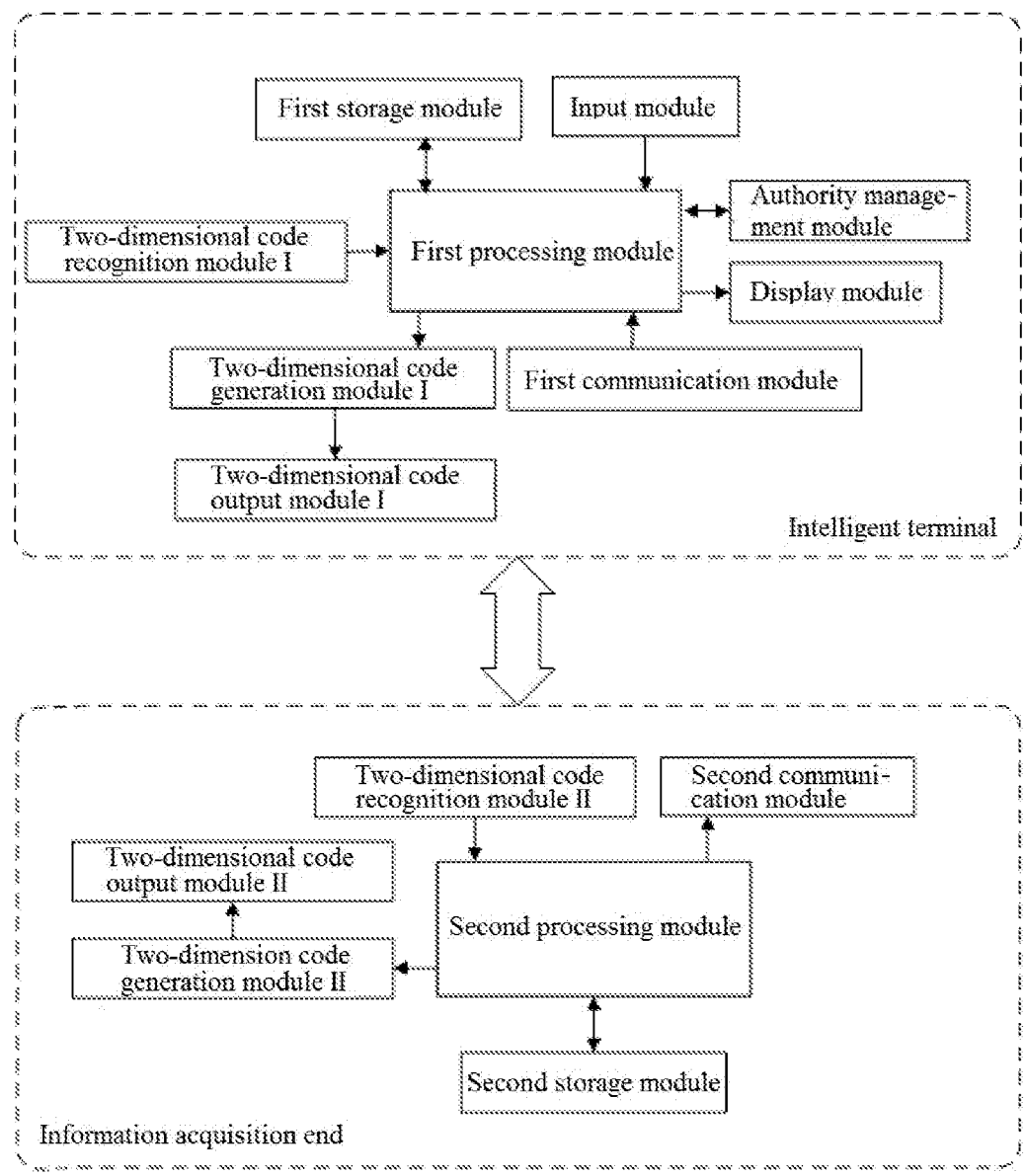
FIG. 1 is a structural block diagram of a information acquisition system according to the present invention.

As shown in FIG. 1, a two-dimensional code based information acquisition system comprises an intelligent terminal and an information acquisition end connected to the intelligent terminal. The intelligent terminal comprises a first communication module configured to receive an index number list transmitted by the information acquisition end; a first storage module configured to store an index table, the index table characterizing a corresponding relation between different index numbers and common user information types; a display module; a first processing module connected to the first communication module, the first storage module, the display module and an input module, and configured to determine a user information type needed by the information acquisition end according to the index number list transmitted by the information acquisition end and with reference to the index table stored by the first storage module, control the display module to display information of the user information type needed by the information acquisition end, extract each index number in the index number list, respectively establish a corresponding relation between each index number extracted and user information inputted by the input module with reference to the index table stored by the first storage module, and form integrated user information through an integration operation; the input module configured to input corresponding user information according to the information of the user information type displayed by the display module; a two-dimensional code output module I; and a two-dimensional code generation module I connected to the first processing module and the two-dimensional code output module I, and configured to convert the integrated user information into a corresponding two-dimensional code and output the two-dimensional code through the two-dimensional code output module I. The information acquisition end comprises: a second communication module configured to transmit the index number list to the intelligent terminal; a second storage module configured to store the index table, the index table characterizing a corresponding relation between different index numbers and common user information types; a two-dimensional code recognition module II connected to the two-dimensional code output module I, and configured to recognize the two-dimensional code outputted by the two-dimensional code output module I and parse out corresponding integrated user information; and a second processing module connected to the second communication module, the second storage module and the two-dimensional code recognition module II, and configured to generate the index number list according to a user information type that needs to be acquired and with reference to the index table stored by the second storage module, and transmit the index number list to the intelligent terminal through the second communication module to obtain user information respectively corresponding to the user information type that needs to be acquired through an extraction operation on the integrated user information. Further: the information acquisition end also comprises a two-dimensional code output module II; and a two-dimensional code generation module II connected to the second processing module, and configured to convert the index number list generated by the second processing module into a corresponding two-dimensional code and output the two-dimensional code through the two-dimensional code output module II. Correspondingly, the intelligent terminal further comprises a two-dimensional code recognition module I connected to the two-dimensional code output module II, and configured to recognize the two-dimensional code outputted by the two-dimensional code output module II and parse out corresponding index number list. The first processing module is connected to the two-dimensional code recognition module I to receive the index number list parsed out by the two-dimensional code recognition module I. Further, the integration operation may specifically be: inserting a separator in a rear end of the user information corresponding to each index number, and then combining each index number with the user information respectively corresponding to each index number, to form the integrated user information. Correspondingly, the extraction operation is: looking up the separators in the integrated user information, separating the information at the front end of each of the separator from the integrated user information in sequence, and acquiring the user information needed according to the user information type characterized by the index number in the information separated. Further, the second processing module is also configured to determine whether each index number in the integrated user information has corresponding user information while performing the extraction operation, and when at least one index number does not have corresponding user information, the second processing module is also configured to generate a user information loss prompt message, and transmit the prompt message to the intelligent terminal through the second communication module. Further, the first processing module is also configured to store a user information type corresponding to the user information inputted by the input module to the first storage module; the first processing module may directly invoke the corresponding user information from the first storage module according to the user information type needed by the information acquisition end, and display the user information invoked through the display module corresponding to the user information type thereof; and the input module may also amend the user information invoked. In addition, the intelligent terminal further comprises an authority management module configured to determine whether a current user has authority to view the user information stored by the first storage module; and after the authority management module determines that the user has authority to view, the first processing module invokes the user information from the first storage module and controls the display module to display the user information correspondingly.

Figure 2:
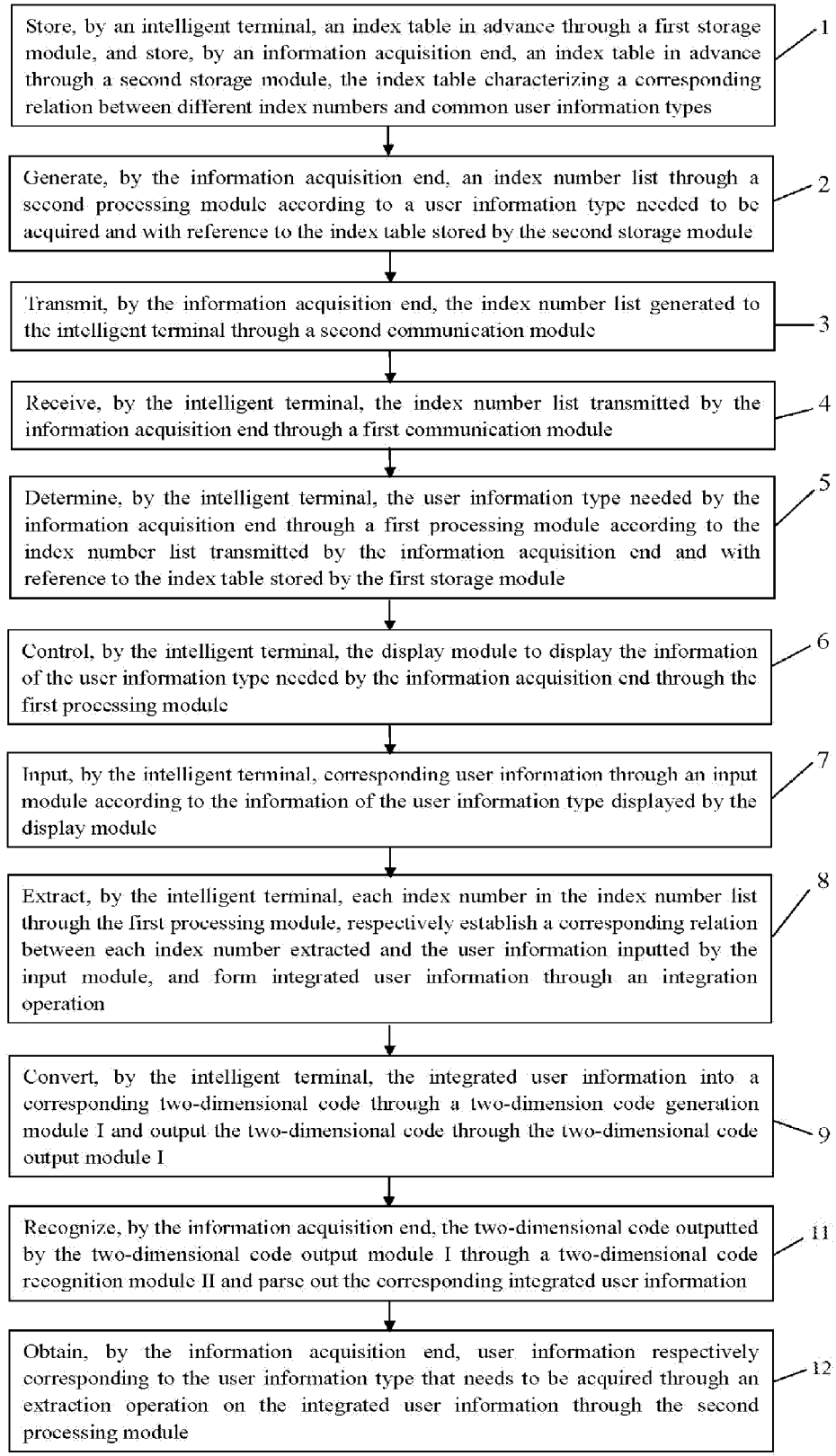
FIG. 2 is a flow chart of an information acquisition method according to the present invention.

As shown in FIG. 2, a two-dimensional code based information acquisition method comprises the following steps of:

step 1: storing, by an intelligent terminal, an index table in advance through a first storage module, and storing, by an information acquisition end, an index table in advance through a second storage module, the index table characterizing a corresponding relation between different index numbers and common user information types;

step 2: generating, by the information acquisition end, an index number list through a second processing module according to a user information type needed to be acquired and with reference to the index table stored by the second storage module;

step 3: transmitting, by the information acquisition end, the index number list generated to the intelligent terminal through a second communication module;

step 4: receiving, by the intelligent terminal, the index number list transmitted by the information acquisition end through a first communication module;

step 5: determining, by the intelligent terminal, the user information type needed by the information acquisition end through a first processing module according to the index number list transmitted by the information acquisition end and with reference to the index table stored by the first storage module;

step 6: controlling, by the intelligent terminal, the display module to display the information of the user information type needed by the information acquisition end through the first processing module;

step 7: inputting, by the intelligent terminal, corresponding user information through an input module according to the information of the user information type displayed by the display module;

step 8: extracting, by the intelligent terminal, each index number in the index number list through the first processing module, respectively establishing a corresponding relation between each index number extracted and the user information inputted by the input module, and forming integrated user information through an integration operation;

step 9: converting, by the intelligent terminal, the integrated user information into a corresponding two-dimensional code through a two-dimension code generation module I and outputting the two-dimensional code through the two-dimensional code output module I;

step 10: recognizing, by the information acquisition end, the two-dimensional code outputted by the two-dimensional code output module I through a two-dimensional code recognition module II and parsing out the corresponding integrated user information; and step 11: obtaining, by the information acquisition end, user information respectively corresponding to the user information type that needs to be acquired through an extraction operation on the integrated user information through the second processing module.

Further, step 3 may also be: converting, by the information acquisition end, the index number list generated into a corresponding two-dimensional code through a two-dimension code generation module II and outputting the two-dimensional code through a two-dimensional code output module II.

Correspondingly, step 4 may also be: recognizing, by the intelligent terminal, the two-dimensional code outputted by the two-dimensional code output module II through the two-dimensional code recognition module I and parsing out a corresponding index number list.

Further, step 7 may also be:

storing, by the intelligent terminal, a user information type corresponding to the user information inputted by the input module in advance through the first storage module, and directly invoking the corresponding user information from the first storage module according to the user information type needed by the information acquisition end through the first processing module.

Further, after the first processing module directly invokes the corresponding user information from the first storage module according to the user information type needed by the information acquisition end, the intelligent terminal may also amend the user information invoked through the input module.

The intelligent terminal according to the present invention may be a computer, a mobile phone, and other electronic devices.

The index table according to the present invention characterizes the corresponding relation between different index numbers and common user information types, wherein the common user information types may be name, address, telephone, mobile phone No., ID Card No., passport No., bank card No., unit name, or the like; the index numbers may be numeral, lowercase, capital letter, roman numerals, or the like, may also be a combination of the different types of symbols above, and may also be above symbols added with bracket, colon, comma, circle, underscore, or the like, wherein different information types are corresponding to each index number one to one, for example, when a numeral added with a colon is used as the index number, then the form of the index table may be 1: name, 2: address, and 3: telephone; and the common user information types in the index table and the corresponding index numbers thereof may further be added, amended, or deleted.

The second processing module according to the present invention generates the index number list according to the user information type needed to be acquired and with reference to the index table stored by the second storage module. It is provided that the user information type needed to be acquired by the information acquisition end comprises name, address, and telephone, and meanwhile, the index table stored by the second storage module is 1. name, 2. address, and 3. telephone, then the index number list generated by the second processing module is 1:2:3:, and after the intelligent terminal receives the index number list, with reference to the index table stored by the first storage module which is 1. name, 2. address, and 3. telephone; it can be determined that the user information type needed to be acquired by the information acquisition end is name, address, and telephone. In this way, only less information is needed to be transmitted between the intelligent terminal and the information acquisition end, which is convenient to process information, does not occupy the space, and is beneficial for applying an information carrier such as the two-dimensional code.

The information acquisition end according to the present invention may transmit the index number list generated to the intelligent terminal through second communication module. Further, the intelligent terminal receives the index number list transmitted by the information acquisition end through the first communication module. Moreover, the index number list generated by the second processing module may also be converted into the corresponding two-dimensional code through the two-dimension code generation module II, and the corresponding two-dimensional code is outputted through the two-dimensional code output module II. Further, the intelligent terminal recognizes the two-dimensional code outputted by the two-dimensional code output module II through the two-dimensional code recognition module I, and parses out the corresponding index number list.

After the intelligent terminal according to the present invention receives the index number list, the first processing module determines the user information type needed by the information acquisition end with reference to the index table stored by the first storage module, and controls the display module to display the information of the user information type needed by the information acquisition end. Further, the input module may input the corresponding user information according to the information of the user information type displayed by the display module. Moreover, the user information type corresponding to the user information inputted by the input module may also be stored in advance through the first storage module, and the corresponding user information may be directly invoked from the first storage module according to the user information type needed by the information acquisition end through the first processing module, and the user may also amend the user information invoked through the input module; i.e., the user information may be obtained through the direct input of the input module according to the user information type needed by the information acquisition end and determined by the first processing module, may also be obtained by the first processing module from the user information stored by the storage module in advance, and may be obtained after amending the user information invoked. Preferably, the input module may also correspondingly input a plurality of user information corresponding to each user information type, for example, titles including dean, professor, and doctoral supervisor, wherein the user information type title is corresponding to such three user information including dean, professor, and doctoral supervisor. Further, the first storage module may store the plurality of user information corresponding to the user information types thereof in advance. When the first processing module invokes the plurality of user information under a certain user information type from the first storage module, the user may select effective user information from the plurality of user information through the input module. In order to reduce the risk of leaking the important user information in use, preferably, each user information may be differentiated through adding an identifier that may be an index number, so that the original user information does not need to be displayed when the user make a selection, and only the identifiers of different user information are needed to be displayed, so as to effectively guarantee the user information security.

The first processing module according to the present invention establishes a corresponding relation between each index number extracted and the user information inputted by the input module, and forms integrated user information through an integration operation. The integration operation may specifically be: inserting a separator in a rear end of the user information corresponding to each index number, and then combining each index number with the user information respectively corresponding to each index number, to form the integrated user information; for example, the index numbers are respectively 1: (representing the information type name), 2: (representing the information type telephone), and 3: (representing the information type address); the user information inputted by the input module respectively corresponding to the name, telephone, and address are Xia Yong, 13912345678, No. 1, Zhongguancun Street, Beijing; then the integrated user information is formed as:

1: Xia Yong, 2: 13912345678, and 3: No. 1, Zhongguancun Street, Beijing, wherein, ";" is the separator, and the integrated user information is a piece of information integrated together.

The user information respectively corresponding to the user information type needed to be acquired is obtained by the second processing module through an extraction operation on the integrated user information, wherein the extraction operation is: looking up the separators in the integrated user information, separating the information at the front end of each of the separator from the integrated user information in sequence, and acquiring the user information needed according to the user information type characterized by the index number in the information separated. As the integrated user information described above, the separators thereinto are looked up, and the information at the front end of each of the separator is separated from the integrated user information in sequence, and then the three parts including 1: Xia Yong, 2: 13912345678, and 3: No. 1, Zhongguancun Street, Beijing, are respectively obtained, then, it is determined that the name is Xia Yong, the telephone is 13912345678, and the address is No. 1, Zhongguancun Street, Beijing according to the information types respectively represented by the index numbers 1:, 2:, and 3:.

A two-dimension code generator of a two-dimension code generating software may be used as the two-dimension code generation module I and the two-dimension code generation module II according to the present invention. The two-dimensional code output module I and the two-dimensional code output module II may be electronic screens displaying an electronic two-dimensional code, or a printing equipment for a papery two-dimensional code. A two-dimensional code recognizer may be used as the two-dimensional code recognition module I and the two-dimensional code recognition module II. The electronic two-dimensional code may be saved or electronically transmitted to others; and the papery two-dimensional code may be carried along and used for a long term.

The second processing module according to the present invention is also configured to determine whether each index number in the integrated user information has corresponding user information while performing the extraction operation, and when at least one index number does not have corresponding user information, the second processing module is also configured to generate a user information loss prompt message, and transmit the prompt message to the intelligent terminal through the second communication module. The intelligent terminal, after receiving the user information loss prompt message transmitted by the information acquisition end, regenerates the integrated user information corresponding to the index number list, converts the integrated user information into the two-dimensional code, and outputs the two-dimensional code to the information acquisition end.

The two-dimensional code based information acquisition system and the method thereof provided by the present invention have an easy and convenient information acquisition process, are rapid and effective, greatly improve the information acquisition efficiency, save the time of the user, avoid the defect that the information acquisition manner in the prior art is easy to get wrong and the risk that the important information of the user is easy to be leaked due to manual filling or dictating, and are beneficial for guaranteeing the user information security effectively.

The above description is merely preferred embodiments of the present invention, but is not intended to limit the protection scope of the present invention. Any equivalent replacement or amendment made by those skilled in the art within the technical scope disclosed by the present invention according to the technical solution of the present invention and the inventive conception thereof shall all fall within the protection scope of the present invention.

What is claimed is:

1. A two-dimensional code based information acquisition system, comprising an intelligent terminal and an information acquisition end connected to the intelligent terminal; wherein the intelligent terminal comprises: a first communication module configured to receive an index number list transmitted by the information acquisition end; a first storage module configured to store an index table; the index table characterizing a corresponding relation between different index numbers and common user information types; a display module; a first processing module connected to the first communication module, the first storage module, the display module and an input module, and configured to determine a user information type needed by the information acquisition end according to the index number list transmitted by the information acquisition end and with reference to the index table stored by the first storage module, control the display module to display information of the user information type needed by the information acquisition end, extract each index number in the index number list, respectively establish a corresponding relation between each index number extracted and user information inputted by the input module with reference to the index table stored by the first storage module, and form integrated user information through an integration operation; the input module configured to input corresponding user information according to the information of the user information type displayed by the display module; a two-dimensional code output module I; and a two-dimensional code generation module I connected to the first processing module and the two-dimensional code output module I, and configured to convert the integrated user information into a corresponding two-dimensional code and output the two-dimensional code through the two-dimensional code output module I; wherein the information acquisition end comprises: a second communication module configured to transmit the index number list to the intelligent terminal; a second storage module configured to store the index table; the index table characterizing a corresponding relation between different index numbers and common user information types; a two-dimensional code recognition module II connected to the two-dimensional code output module I, and configured to recognize the two-dimensional code outputted by the two-dimensional code output module I and parse out corresponding integrated user information; and a second processing module connected to the second communication module, the second storage module and the two-dimensional code recognition module II, and configured to generate the index number list according to a user information type that needs to be acquired and with reference to the index table stored by the second storage module, and transmit the index number list to the intelligent terminal through the second communication module to obtain user information respectively corresponding to the user information type that needs to be acquired through an extraction operation on the integrated user information.

2. A two-dimensional code based information acquisition system according to claim 1, wherein the said information acquisition end also comprises: a two-dimensional code output module II; and a two-dimensional code generation module II connected to the second processing module, and configured to convert the index number list generated by the second processing module into a corresponding two-dimensional code and output the two-dimensional code through the two-dimensional code output module II; correspondingly, the intelligent terminal further comprises: a two-dimensional code recognition module I connected to the two-dimensional code output module II, and configured to recognize the two-dimensional code outputted by the two-dimensional code output module II and parse out a corresponding index number list; wherein the first processing module is connected to the two-dimensional code recognition module I to receive the index number list parsed out by the two-dimensional code recognition module I.

3. A two-dimensional code based information acquisition system according to claim 1, wherein the said integration operation may specifically be: inserting a separator in a rear end of the user information corresponding to each index number, and then combining each index number with the user information respectively corresponding to each index number, to form the integrated user information; correspondingly, the extraction operation is: looking up the separators in the integrated user information, separating the information at the front end of each of the separator from the integrated user information in sequence, and acquiring the user information needed according to the user information type characterized by the index number in the information separated.

4. A two-dimensional code based information acquisition system according to claim 1, wherein the said second processing module is also configured to determine whether each index number in the integrated user information has corresponding user information while performing the extraction operation, and when at least one index number does not have corresponding user information, the second processing module is also configured to generate a user information loss prompt message, and transmit the prompt message to the intelligent terminal through the second communication module.

5. A two-dimensional code based information acquisition system according to claim 1, wherein the said first processing module is also configured to store a user information type corresponding to the user information inputted by the input module to the first storage module; the first processing module may directly invoke the corresponding user information from the first storage module according to the user information type needed by the information acquisition end, and display the user information invoked through the display module corresponding to the user information type thereof; and the input module may also amend the user information invoked.

6. A two-dimensional code based information acquisition system according to claim 5, wherein the said intelligent terminal further comprises an authority management module configured to determine whether a current user has authority to view the user information stored by the first storage module; and after the authority management module determines that the user has authority to view, the first processing module invokes the user information from the first storage module and controls the display module to display the user information correspondingly.

7. A two-dimensional code based information acquisition method, comprising the following steps of:
    step 1: storing, by an intelligent terminal, an index table in advance through a first storage module, and storing, by an information acquisition end, an index table in advance through a second storage module, the index table characterizing a corresponding relation between different index numbers and common user information types;
    step 2: generating, by the information acquisition end, an index number list through a second processing module according to a user information type needed to be acquired and with reference to the index table stored by the second storage module;
    step 3: transmitting, by the information acquisition end, the index number list generated to the intelligent terminal through a second communication module;
    step 4: receiving, by the intelligent terminal, the index number list transmitted by the information acquisition end through a first communication module;
    step 5: determining, by the intelligent terminal, the user information type needed by the information acquisition end through a first processing module according to the index number list transmitted by the information acquisition end and with reference to the index table stored by the first storage module;

step 6: controlling, by the intelligent terminal, the display module to display the information of the user information type needed by the information acquisition end through the first processing module;

step 7: inputting, by the intelligent terminal, corresponding user information through an input module according to the information of the user information type displayed by the display module;

step 8: extracting, by the intelligent terminal, each index number in the index number list through the first processing module, respectively establishing a corresponding relation between each index number extracted and the user information inputted by the input module, and forming integrated user information through an integration operation;

step 9: converting, by the intelligent terminal, the integrated user information into a corresponding two-dimensional code through a two-dimension code generation module I and outputting the two-dimensional code through the two-dimensional code output module I;

step 10: recognizing, by the information acquisition end, the two-dimensional code outputted by the two-dimensional code output module I through a two-dimensional code recognition module II and parsing out the corresponding integrated user information; and step 11: obtaining, by the information acquisition end, user information respectively corresponding to the user information type that needs to be acquired through an extraction operation on the integrated user information through the second processing module.

8. A two-dimensional code based information acquisition method according to claim 7, wherein the said step 3 may also be: converting, by the information acquisition end, the index number list generated into a corresponding two-dimensional code through a two-dimension code generation module II and outputting the two-dimensional code through a two-dimensional code output module II; correspondingly, step 4 may also be: recognizing, by the intelligent terminal, the two-dimensional code outputted by the two-dimensional code output module II through the two-dimensional code recognition module I and parsing out a corresponding index number list.

9. A two-dimensional code based information acquisition method according to claim 7, wherein the said step 7 may also be:

storing, by the intelligent terminal, a user information type corresponding to the user information inputted by the input module in advance through the first storage module, and directly invoking the corresponding user information from the first storage module according to the user information type needed by the information acquisition end through the first processing module.

10. A two-dimensional code based information acquisition method according to claim 9, wherein, after the first processing module directly invokes the corresponding user information from the first storage module according to the user information type needed by the information acquisition end, the intelligent terminal may also amend the user information invoked through the input module.

\* \* \* \* \*